(12) United States Patent
van der Voort et al.

(10) Patent No.: US 10,039,305 B2
(45) Date of Patent: Aug. 7, 2018

(54) APPARATUS AND PROCESS FOR HEAT TREATING A PACKAGED FOOD PRODUCT

(71) Applicant: Top B.V., PW Wageningen (NL)

(72) Inventors: Aart-Jan van der Voort, JA Wageningen (NL); Henricus Franciscus Maria van den Bosch, AC Gassel (NL); Henricus Johannes Schuten, HP Arnhem (NL)

(73) Assignee: Top B.V., PW Wageningen (NL)

( * ) Notice: Subject to any disclaimer, the term of this patent is extended or adjusted under 35 U.S.C. 154(b) by 0 days.

(21) Appl. No.: 15/089,874

(22) Filed: Apr. 4, 2016

(65) Prior Publication Data

US 2016/0213050 A1 Jul. 28, 2016

Related U.S. Application Data

(62) Division of application No. 13/900,809, filed on May 23, 2013, now abandoned.

(30) Foreign Application Priority Data

May 25, 2012 (NL) ..................................... 2008879

(51) Int. Cl.
*H05B 6/62* (2006.01)
*H05B 6/60* (2006.01)
(Continued)

(52) U.S. Cl.
CPC ................. *A23L 3/01* (2013.01); *A23L 3/005* (2013.01); *A23L 3/02* (2013.01); *A23L 3/045* (2013.01);
(Continued)

(58) Field of Classification Search
CPC ........ A23L 1/01; A23L 1/0128; A23L 1/0135; A23L 1/0257; A23L 3/01; A23L 3/02;
(Continued)

(56) References Cited

U.S. PATENT DOCUMENTS 3,235,388 A * 2/1966 Francis ................ A22C 11/001
99/352
4,546,226 A 10/1985 Trembley et al.
(Continued)

FOREIGN PATENT DOCUMENTS

WO WO2011/062499 5/2011

*Primary Examiner* — Hung D Nguyen
(74) *Attorney, Agent, or Firm* — Occhiuti & Rohlicek LLP

(57) ABSTRACT

A method for heat treating a packaged product includes providing a channel with a liquid disposed therein, the channel having a electrodes disposed in and spaced apart along a treatment portion of the channel, pressurizing the liquid in the treatment portion of the channel, transporting the packaged product, including a product disposed within a package, along the channel including transporting the packaged product through the treatment portion of the channel, heating the packaged product in the treatment portion of the channel including causing emission of radio frequency waves between the plurality of electrodes and into the treatment portion of the channel including forming an electrical field in the treatment portion of the channel, and shielding the electrical field in the treatment portion of the channel using a shield which forms a cavity around the treatment portion of the channel, the cavity being configured to substantially confine the electrical field.

21 Claims, 5 Drawing Sheets

(51) Int. Cl.
   *H05B 6/48*    (2006.01)
   *A23L 3/01*    (2006.01)
   *H05B 6/54*    (2006.01)
   *A23L 3/04*    (2006.01)
   *A23L 3/005*   (2006.01)
   *A23L 3/02*    (2006.01)
   *A23L 5/10*    (2016.01)
   *A23L 5/30*    (2016.01)

(52) U.S. Cl.
   CPC .......... *A23L 5/15* (2016.08); *A23L 5/17* (2016.08); *A23L 5/36* (2016.08); *H05B 6/54* (2013.01); *H05B 6/60* (2013.01); *A23V 2002/00* (2013.01); *Y02P 60/85* (2015.11)

(58) Field of Classification Search
   CPC . A23L 3/005; A23L 3/045; A23L 5/15; A23L 5/17; A23L 5/36; H05B 6/54; H05B 6/60; A23V 2002/00; Y02P 60/85
   USPC ....... 219/620, 653, 665, 681, 700, 761, 696, 219/697, 772, 778, 771, 776, 775; 426/234, 237, 241, 392, 397, 403, 520, 426/521; 99/352, 355, 451, 483
   See application file for complete search history.

(56) References Cited

U.S. PATENT DOCUMENTS

| | | |
|---|---|---|
| 4,956,532 A | 9/1990 | Koch |
| 4,974,503 A | 12/1990 | Koch |
| 6,177,662 B1* | 1/2001 | Rutledge ................ A23L 3/005 |
| | | 219/620 |
| 6,246,040 B1* | 6/2001 | Gunn ...................... H05B 6/48 |
| | | 219/771 |
| 6,323,473 B1 | 11/2001 | Yamamoto et al. |
| 2005/0019025 A1 | 1/2005 | Wild et al. |
| 2010/0089250 A1 | 4/2010 | De Heij |
| 2013/0168386 A1* | 7/2013 | Pfeiffer ................ A23L 3/005 |
| | | 219/653 |

* cited by examiner

APPARATUS AND PROCESS FOR HEAT TREATING A PACKAGED FOOD PRODUCT

CROSS REFERENCE TO RELATED APPLICATION

This application is a divisional of U.S. application Ser. No. 13/900,809 filed May 23, 2013, which claims the benefit of International Application No. NL 2008879 filed May 25, 2012. The contents of these applications are incorporated herein by reference.

FIELD OF THE INVENTION

The invention relates to an apparatus for heat treating a packaged (food) product, as well as to a process for heat treating a packaged (food) product with such apparatus.

BACKGROUND OF THE INVENTION

Processes to heat treat food products are known in the art. U.S. Pat. No. 4,956,532, for instance, describes a method and apparatus for even and rapid heating, pasteurization or sterilization of products contained in a package, such as, for example, pharmaceutical products or food, which are conveyed through a microwave treatment chamber on a continuous conveyor belt. In order to heat components of the products having different heat absorption for the purpose of reaching the pasteurization temperature rapidly and evenly, the temperature of the components is recorded by a temperature sensor, and on the basis of this the computer calculates the respective ΔT, taking into account given product parameters and the desired temperature to be reached. When the product passes under the following input aperture, a given microwave energy level is coupled into each specific component, as a result of which an even temperature of all products in the package is achieved very rapidly without overheating of the product.

Further, WO2011062499 describes for instance a device for pasteurizing a mass of foodstuff which comprises: a feed; a first tube of an electrically and magnetically inert material suitable for contact with foodstuff; an arrangement of electrodes added to the first tube and connected to an RF power generator so that the mass present in the first tube can be heated in this first tube. Co-acting electrodes are disposed with a substantial mutual axial interspace.

SUMMARY OF THE INVENTION

A disadvantage of prior art prior art systems may be that they do not efficiently couple energy into the system. Further, many prior art systems are not able to (efficiently) heat treat packaged food products, such as for instance (packaged) meals. Hence, it is an aspect of the invention to provide an alternative apparatus and/or alternative process for heat treating a packaged food product, which preferably further at least partly obviate one or more of above-described drawbacks.

In a first aspect, the invention provides an apparatus ("apparatus") for heat treating a (packaged) product, especially a (packaged) food product, in a ((packaged) food) heat treating process, especially a continuous ((packaged) food) heat treating process, the apparatus comprising:

a. a channel with a channel length, a channel axis and a channel wall, wherein especially the channel wall surrounds a channel interior;

b. an optional pressurizer configured to control the pressure of a liquid within the channel (which liquid is present during operation of the apparatus);

c. an optional transport unit configured to transport the (packaged) product, especially the (packaged) food product, in a propagation direction through the channel (containing the liquid);

d. a first electrode, surrounding at least part of the channel interior over a first electrode length, (the first electrode) configured at a channel axis-to-first electrode length (i.e. distance between first electrode and channel axis);

e. an electrode configuration comprising (i) a second electrode, arranged at a non-zero inter electrode distance from the first electrode, the second electrode surrounding at least part of the channel interior over a second electrode length and configured at a channel axis-to-second electrode length, and (ii) an electrically conductive remote part ("remote part"), in electrically conductive contact with the second electrode, configured at a channel axis-to-remote part length (i.e. distance between the remote part and channel axis) wherein the axis-to-remote part length is preferably larger than the axis-to-second electrode length, and (the electrically conductive remote part) surrounding at least part of the channel interior over a remote part surrounding length (for shielding at least part of the channel);

f. a radio frequency (RF) wave generator configured to generate RF-waves between the first electrode and the second electrode.

In a further aspect, the invention provides a process for heat treating a (packaged) product, especially a packaged food product (comprising a food product within a package), especially with the apparatus as defined herein, wherein the process comprises transporting the (packaged food) product through a channel filled with the pressurized liquid and heating the (food) product (i.e. especially the food product within a package) in a treatment zone of the channel by generating RF-waves, especially at a frequency selected from the range of 10-50 MHz, between the first electrode and the second electrode.

With such apparatus and such process, efficiently energy may be coupled into the (packaged food) product. Further, with such apparatus and such process, packaged food products may be heat treated, for instance for heating a meal and/or for pasteurizing a food product. A further advantage of the present apparatus and such process is that it may be configured to be used in a continuous process (although the present apparatus and process may also be configured to be used in a batch process). Hence, in a further embodiment, the invention also provides such process, wherein the process is a continuous process. The apparatus and process are herein especially further explained with respect to a packaged food product as embodiment of a product, especially as embodiment of a packaged food product.

Due to the configuration of the apparatus, a cavity is created, wherein efficiently energy may be provided to the product, without substantial loss of energy to the surroundings. Further, due to the transport through the channel, all (food) products may be subjected to the same conditions, even when there are local variations within the channel of the RF-field.

The process that may be applied with the apparatus is herein indicated as "heat treating process", in specific embodiments "packaged food heat treating process", (further also shortly indicated as "heat treating process" or simply "process"), and the apparatus described herein is especially suitable for heat treating a packaged food product in such packaged food heat treating process.

The term "heat treating" may include heating the food product, but may in another embodiment also include pasteurizing the food product, or in yet another embodiment include sterilizing the food product. In an embodiment, the heat treatment may include heating the food product (surrounded by the liquid) within the channel (especially within the treatment zone) to a temperature in the range of 50-150° C., such as 85-125° C. Hence, with the process and apparatus, the product, especially the product in the package, can be heat treated, such as for sterilizing or pasteurizing purposes; however, the process and apparatus may also be applied for other purposes (see also below).

The apparatus may be configured for heat treating packaged food products. In principle, the apparatus may also be applied for heat treating other types of packaged products, such as a packaged pharmaceutical product, a packaged neutraceutical product, a packaged (medical) tool, etc. Hence, in a further aspect, the invention provides such apparatus as described herein for heat treating a packaged product (per se). However, the invention will further be described with reference to (packaged) food products (as also indicated above).

Especially, the food product may comprise a product selected from the group consisting of a meal, a meal component, a potato, a vegetable, meat, a dairy product, and a soup. As will be clear to a person skilled in the art, the food product may also comprise a combination of products, such as a food product comprising potatoes, vegetable(s) and meat. The term food product may relate to any product that is intended for oral human (or animal) consumption.

Especially, the food product is packaged. As a result of the package, the (packaged) food product can be transported with or through the liquid, as the channel is filled with liquid (during operation of the process) (see also below). Hence, during processing the packaged food product may substantially be surrounded by the (pressurized) liquid. Preferably, during processing the packaged food product, at least in the treatment zone (herein also indicated as "heat treatment zone"), is entirely surrounded by the liquid. Due to the presence of the liquid, the thermal energy generated within the channel may efficiently be provided to the food product.

Especially, the package (of the packaged food product) is electrically insulating. The electrical resistivity ($\rho$) may for instance be at least $5 \cdot 10^4$ $\Omega$m (at 20° C.), such as at least $1 \cdot 10^5$ $\Omega$m (at 20° C.), especially at least $1 \cdot 10^8$ $\Omega$m (at 20° C.), even more especially at least $1 \cdot 10^{12}$ $\Omega$m (at 20° C.), such as a package of poly ethylene (PE), like HDPE or LDPE, etc. (see also other examples of suitable materials below, wherein those materials are described in relation to the material of the channel wall).

The liquid used in the channel may be de-ionized water or oil, or a combination thereof. Hence, in an embodiment, the liquid comprises one or more of de-ionized water and oil. Also the liquid preferably has a high electrical resistivity, such as preferably at least $1 \cdot 10^1$ $\Omega$m (at 20° C.), even more preferably at least $1 \cdot 10^2$ $\Omega$m (at 20° C.), yet even more preferably at least at least $1 \cdot 10^3$ $\Omega$m (at 20° C.), like especially at least at least $1 \cdot 10^4$ $\Omega$m (at 20° C.), such as especially at least at least $1 \cdot 10^5$ $\Omega$m (at 20° C.). Especially, the liquid used in the channel may be liquid having a high dielectric constant (k), such as at least 2, even more especially at least 5, like at least 10, such as at least 20, or even higher, like at least 20, such as at least 40 (at room temperature). How effective a dielectric is at allowing a capacitor to store more charge may depend on the material the dielectric is made from. Every material has a dielectric constant k. This is the ratio of the field without the dielectric (Eo) to the net field (E) with the dielectric (k=Eo/E).

The packaged food product may in an embodiment comprise "brick" like (flow) packages. The packages may for instance have a length selected from the range of 5-100 cm, a height selected from the range of 1-50 cm, and a width selected from the range of 1-50 cm. The volume of the packaged food product, at RT and atmospheric pressure may for instance be in the range of 0.1-10 dm$^3$, such as 0.5-5 dm$^3$.

The apparatus comprises a channel through which one or more packaged food products may be transported. Over at least part of the length of the channel, the packaged food products may be treated. This is indicated as treatment zone, and is in general the zone between the first and the second electrode(s) (see also below); this may in an embodiment be substantially equal to the remote surrounding length, i.e. the length over which the remote part of the electrode configuration shields the channel.

The channel comprises a channel wall, enclosing or surrounding a channel interior. Especially, the channel interior is the hollow space that is enclosed by the channel wall. During use, the channel interior is in general substantially entirely filled with liquid Over at least part of the length, and at least the treatment zone, during processing the channel interior will completely be filled with the liquid (and one or more packaged food products when during processing such one or more packaged food products are transported through the treatment zone). The channel interior is the volume enclosed by the channel wall. The cross-section of the channel (especially over the treatment zone) may for instance be square, rectangular, circular, oval, elliptical, etc. Especially, the cross-section of the channel (especially over the treatment zone) is selected from the group consisting of circular, oval, and elliptical, even more especially circular. The channel is elongated and has an axis or elongation axis. The distance from the axis to channel wall may be in the range of for instance 15-250 mm. Within one cross-section, this distance may be identical over the entire cross-section (circular), or may include different distances (like in all other cases except circular). Hence, the terms "surrounding" and "circumferential" do not necessarily refer to round items, but in general indicate the perimeter.

The channel wall is electrically insulating, except for those parts where an electrode forms optionally part of the channel wall. Like for the package of the packaged food product, the material of the channel wall, except for those parts where forms optionally part of the channel wall, the electrical resistivity ($\rho$) may for instance be at least $1 \cdot 10^5$ $\Omega$m (at 20° C.), especially at least $1 \cdot 10^8$ $\Omega$m (at 20° C.), even more especially at least $1 \cdot 10^{12}$ $\Omega$m (at 20° C.).

Especially, the insulating material is selected from the group consisting of PE (polyethylene), PP (polypropylene), PEN (polyethylene naphthalate), PC (polycarbonate), polymethylacrylate (PMA), polymethylmethacrylate (PMMA) (Plexiglas or Perspex), cellulose acetate butyrate (CAB), silicone, polyvinylchloride (PVC), polyethyleneterephthalate (PET), (PETG) (glycol modified polyethyleneterephthalate), PDMS (polydimethylsiloxane), COC (cyclo olefin copolymer), polyether ether ketone (PEEK), poly (phenyl)sulfone (P(P)SU), polyethyleneamine (PEA), polyethyleneimine (PEI), polyimide (PI), poly(phenylene oxide) (PPO) and polybenzimidazole (PBI). As will be clear to a person skilled in the art, also a combination of (such) materials may be applied.

The apparatus may further comprise a pressurizer. Such pressurizer may include a pump, to bring the liquid (within the channel, and at least over the treatment zone) at the desired pressure. Alternatively or additionally, the pressurizer may comprise one or more pressure towers (sometimes also indicated as "tower-type sterilizer" or "water column" or "water column type sterilizer"), i.e. columns with liquid that can be used to build up pressure. Upstream and downstream of the heat treatment zone, pressure locks may be arranged to keep the pressure in the treatment zone at the desired value. Especially, the pressurizer is configured to maintain the liquid within the channel (over at least a part of the channel defined by the remote part surrounding length) at a pressure of over 1 bar, especially at a pressure selected from the range of 1.5-6 bars, especially 2-5 bar (during operation of the process). Hence, in an embodiment, the pressurizer is configured to maintain the liquid within the treatment zone at a pressure selected from the range of 1.5-6 bar, especially 2-5 bar. Therefore, the process of the invention may further comprise maintaining the liquid within the channel at a pressure of over 1 bar, especially at a pressure selected from the range of 1.5-6 bar, especially 2-5 bar.

The apparatus may further comprise a transport unit, configured to transport the packaged food product in a propagation direction through the channel. The transport unit can be any unit that is suitable to transport the packaged food product(s) through the channel. As will be clear to the person skilled in the art, in certain embodiments the transport unit may thus (also) be configured to transport the (packaged) (non-food) product in a propagation direction through the channel The liquid within the channel may be stationary, but the liquid may also flow through the channel. Hence, a unit that is configured to generate the liquid flow may also have the function of transport unit. Hence, a pump or other means that is configured to transport the liquid through the channel might be used as pressurizer and/or transport unit. However, the apparatus may be configured and/or the process may be designed to have substantially no flow of the liquid. Hence, in an additional or alternative option, the apparatus may have a (separate) transport unit configured to push the packaged food products through the channel or to pull a train of packaged food products through the channel. For instance, the packages can continuously be transported through the channel by pushing the upstream product and keeping the downstream products in a head-to-tail position. The transport unit may comprise a chain or rotators for transporting the packaged food products through the channel. Alternatively or additionally, the transport unit may be configured to push the packaged food product through the channel. For instance, the packaged food product may be transported in trays, which are pushed through the channel.

The process of the invention may further comprise transporting the packaged food product through the channel filled with the pressurized liquid with a transport speed in the range of 0.1-10 cm/sec, such as 0.5-5 cm/sec. Hence, the transport unit may be configured to transport the packaged food product through the channel (filled with the pressurized liquid) with a transport speed in the range of 0.1-10 cm/sec, such as 0.5-5 cm/sec.

A further element of the apparatus is the combination of first electrode and electrode configuration containing the second electrode. The electrodes are used to create the RF field, and the electrode configuration is especially be configured to substantially confine the RF field within a cavity. In this way, the energy may efficiently be applied to heat treat the products, especially the (packaged) food products, within the treatment zone.

The apparatus comprises above-mentioned first electrode, surrounding at least part of the channel interior over a first electrode length, configured at a channel axis-to-first electrode length. When seen in a cross-sectional view, this especially implies that the first electrode at least partially surrounds the channel interior. Preferably, the first electrode entirely surrounds the channel interior, i.e. a first electrode having a square, rectangular, circular, oval, elliptical, etc. shape (when seen in a cross-sectional view) (see also above in relation to the geometry of the channel). Further, such first electrode has a length (i.e. the length in a direction parallel to the channel axis), the first electrode length, which may be in the range of 1 mm to 50 cm. Especially, the first electrode is embedded in the channel wall. Hence, the distance (radius in case of a channel having a circular cross-section) of the first electrode to the channel axis, i.e. the channel axis-to-first electrode length may (substantially) be the same as the distance of the channel axis to the channel wall (at positions within the channel (within the treatment zone), where there is no electrode (but insulating material, see also above)).

At non-zero distance from the first electrode, one or two (or optionally more), second electrodes may be arranged. The second electrode is especially part of an electrode configuration, see below.

Hence, the apparatus may comprise also above-mentioned second electrode, surrounding at least part of the channel interior over a second electrode length, configured at a channel axis-to-second electrode length. When seen in a cross-sectional view, this implies that the second electrode at least partially surrounds the channel interior. Preferably, the second electrode entirely surrounds the channel interior, i.e. an second electrode having a square, rectangular, circular, oval, elliptical, etc. shape (when seen in a cross-sectional view) (see also above in relation to the geometry of the channel). Further, such second electrode has a length (i.e. the length in a direction parallel to the channel axis), the second electrode length, which may be in the range of 1 mm to 50 cm. Especially, the second electrode is embedded in the channel wall. Hence, the distance (radius in case of a channel having a circular cross-section) of the second electrode to the channel axis, i.e. the channel axis-to-second electrode length may (substantially) be the same as the distance of the channel axis to the channel wall (at positions within the channel (within the treatment zone), where there is no electrode (but insulating material, see also above)).

The remote part may also be indicated as part for shielding the electrical field or mantle. The remote part may coaxially surround at least part of the channel (see also below). Hence, in an embodiment, the remote part is configured to coaxially surround at least part of the channel. Especially, the first electrode is configured at that part of the channel wall that is also coaxially surrounded by the remote part.

Therefore, in an embodiment the first electrode and the second electrode are embedded the channel wall and are in physical contact with the interior of the channel, and the channel wall further comprises an electrically insulating material. Hence, when liquid flows through the channel, the liquid will be in contact with the first and second electrode(s); hence, when the channel is empty, and filled with for instance, air, the first and the second electrode are in physical contact with the air. For this reason, the liquid is substantially not electrical conductive (see also above). Hence, during processing the first electrode and the second electrode may be in physical contact with the pressurized liquid. Thus, in an embodiment the electrodes are not disposed electrically insulated relative to the inner surface of the channel wall (coming into direct contact with the liquid).

In general, the apparatus will comprise a set of the first electrode and the second electrode, or a set of the first electrode and at both sides of the first electrode two second electrodes (being arranged)(see also below). As will be clear to a person skilled in the art, the apparatus may also comprise a plurality of such sets of first electrode and second electrode(s). Hence, the first and the second electrode(s) are arranged at a substantial mutual axial interspace (between the first and the second electrode(s, respectively).

Below, first the electrode configuration is elucidated in more detail.

As indicated above, the apparatus comprises an electrode configuration comprising (i) the second electrode (see also above), and (ii) an electrically conductive remote part, in electrically conductive contact with the second electrode, configured at a channel axis-to-remote part length wherein axis-to-remote part length is larger than the axis-to-second electrode length, and surrounding at least part of the channel interior over a remote part surrounding length (for shielding at least part of the channel).

Hence, the electrode configuration may comprise a kind of a coaxial arranged electrode or electrode configuration, with the electrode itself at a short distance from the channel axis and a remote part, a kind of mantle, arranged at a larger distance from the channel axis than the (first and the) second electrode, and configured to at least partially enclose, (especially) at a non-zero distance from the channel wall, the channel. In this way, at least part of the channel, especially at least a substantial part of the heat treatment zone, is shielded by the remote part. In this way, the RF-field may be substantially contained in a cavity. This cavity may be formed by the electrode configuration.

For instance, in a specific embodiment the channel may have a cylindrical shape and the electrically conductive remote part has a cylindrical shape over the remote part surrounding length. Hence, in an embodiment both the channel and the remote part have a cylindrical cross section.

In a specific embodiment, the electrode configuration comprises two sets of second electrodes and electrically conductive remote parts, arranged at both sides of the first electrode, wherein the two sets of second electrodes are in physical contact with each other via the electrically conductive remote parts. In this way, a kind of remote channel or mantle may be arranged shielding the heat treatment zone. Thus, in an embodiment, a coaxial arrangement of the channel (with electrodes) and the remote part(s), which is in electrical connection with the second electrode(s), coaxially enclosing the channel may be provided. Note that the two sets of electrically conductive remote parts may (in fact) be a single unit (with an opening in the remote part for introduction of the currency conductor (such as an electrical wire) for the first electrode.

Especially preferred is that the second electrode is earthed. Further, optionally the channel with first electrode and electrode configuration may electronically be shielded in a Faraday cage.

Further, the apparatus may comprise a radio frequency (RF) wave generator configured to generate RF-waves between the first electrode and the second electrode. Of course, when there are more sets of first electrode and second electrode(s), the RF wave generator may be arranged to generate RF-waves between the first electrode and the second electrode(s) of each set. However, in case there are more sets of first electrode and second electrode(s), optionally each set may be driven by a separate radio frequency wave generator.

Optionally, the electrodes are coupled to the associated RF generator via an adjustable impedance matching circuit. Such impedance matching circuit may be applied to further comprise in the process (the ability) of optimizing the electrical energy input and output. The one or more of the frequency, the voltage and the impedance may be adjusted with the impedance matching circuit to optimize energy input in the cavity, more especially the thermal treatment zone, even more especially the packaged food products, and to minimize energy loss out of the thermal treatment zone. In an embodiment, the impedance matching circuit may comprise a variable capacitor connected in series and a variable second capacitor connected in parallel to electrodes.

In a specific embodiment, the radio frequency (RF) wave generator (optionally in combination with the impedance matching circuit) is configured to generate RF-waves between the first electrode and the second electrode at a frequency selected from the range of 10-50 MHz, especially 12-29 MHz. Further, the radio frequency (RF) wave generator may be configured to generate over the first electrode and the second electrode an oscillating voltage in the range of 100-50,000 V (i.e. 0.1-50 kV). Therefore, in the process of the invention the frequency (of the RF field) may be selected from the range of 12-29 MHz, especially 13.56 MHz or 27.12 MHz. The process may further comprise applying an oscillating voltage between the first electrode and the second electrode in the range of 100-50,000 V.

With respect to dimensions, in an embodiment the channel axis-to-first electrode length may be in the range of 10-500 mm, especially 15-250 mm, like 20-150 mm. The same may apply to the axis-to-second electrode length. Especially, when the channel axis-to-first electrode length (and axis-to-second electrode length) is in the range of 10-100 mm, such as 15-100 mm, the radio frequency (RF) wave generator may be configured to generate RF-waves between the first electrode and the second electrode at a frequency selected from the range of 25-29 MHz, especially 27.12 MHz. Especially, when the channel axis-to-first electrode length (and axis-to-second electrode length) is larger than 100 mm, the radio frequency (RF) wave generator is may be configured to generate RF-waves between the first electrode and the second electrode at a frequency selected from the range of 12-14 MHz.

Further, preferably the apparatus has a ratio of the channel axis-to-remote part length to the channel axis-to-second first electrode length (and axis-to-second electrode length) in the range of 1.5-7, especially 2-4. This may especially provide a good shielding.

The first electrode length and the second electrode length (i.e. the length along or parallel to the channel axis) may independently be selected from the range of 0.1 mm-50 cm, such as 1 mm-20 cm. The inter-electrode distance between the first electrode and the second electrode may be selected from the range of 1.5 mm-50 m, but may in general be selected from the range of 20 cm-20 m, such as 20 cm-10 m. The remote part surrounding length may substantially be equal to the inter-electrode distance, i.e. $L4 \approx L2$.

In an embodiment, the apparatus has a ratio of the second electrode length to the first electrode length in the range of 0.1-50, such as 1-50, like 1-10, such as 1-2, like 1.5. Further, in an embodiment, the apparatus has a ratio of the first electrode length to the channel axis-to-second electrode length in the range of 0.1-4, especially 1-3.

Hence, the invention provides an apparatus (for heat treating a packaged food product), comprising (a) a channel surrounding a channel interior, (b) a pressurizer, (c) a transport unit, (d) a first electrode, surrounding at least part of the channel interior over a first electrode length, (e) an electrode configuration comprising (i) a second electrode surrounding at least part of the channel interior over a remote part surrounding length (for shielding at least part of the channel), and (f) a radio frequency wave generator configured to generate RF-waves between the first and second electrode. With such apparatus efficiently energy may be coupled into the packaged food product, for instance for heating a meal and/or for pasteurizing a food product. A further advantage of the present apparatus and such process is that it may be configured to be used in a continuous process.

In another aspect, an apparatus for heat treating a packaged product in a heat treating process includes a channel with a channel length (L), a channel axis and a channel wall, wherein the channel wall surrounds a channel interior, a pressurizer configured to control the pressure of a liquid within the channel, a transport unit configured to transport the packaged product in a propagation direction through the channel, a first electrode, surrounding at least part of the channel interior over a first electrode length (L1), configured at a channel axis-to-first electrode length (D1), an electrode configuration comprising (i) a second electrode, arranged at a non-zero inter electrode distance (L2) from the first electrode, the second electrode surrounding at least part of the channel interior over a second electrode length (L3) and configured at a channel axis-to-second electrode length (D3), and (ii) an electrically conductive remote part, in electrically conductive contact with the second electrode, configured at a channel axis-to-remote part length (D2) wherein D2>D3, and surrounding at least part of the channel interior over a remote part surrounding length (L4) for shielding at least part of the channel, a radio frequency (RF) wave generator configured to generate RF-waves between the first electrode and the second electrode. The first electrode and the second electrode are embedded in the channel wall and are in physical contact with the interior of the channel, and wherein the channel wall further comprises an electrically insulating material.

Aspects may include one or more of the following features. The radio frequency (RF) wave generator may be configured to generate RF-waves between the first electrode and the second electrode at a frequency selected from the range of 10-50 MHz, wherein the packaged product comprises a packaged food product, and wherein the second electrode is earthed. The radio frequency (RF) wave generator may be configured to generate over the first electrode and the second electrode an oscillating voltage in the range of 100-50,000 V. The channel axis-to-first electrode length (D1) may be in the range of 15-100 mm, and the radio frequency (RF) wave generator may be configured to generate RF-waves between the first electrode and the second electrode at a frequency selected from the range of 25-29 MHz. The channel axis-to-first electrode length (D1) may be larger than 100 mm, and the radio frequency (RF) wave generator may be configured to generate RF-waves between the first electrode and the second electrode at a frequency selected from the range of 12-14 MHz.

The apparatus may include a ratio of the channel axis-to-remote part length (D2) to the channel axis-to-second first electrode length (D1) in the range of D2/D1=1.5-7, and the channel may have a cylindrical shape and wherein the electrically conductive remote part has a cylindrical shape over the remote part surrounding length (L4), in particular having a circle a cylindrical shape. The pressurizer may be configured to maintain the liquid within the channel, during use of the apparatus, at a pressure selected from the range of 1.5-6 bar. The electrode configuration may include two sets of second electrodes and electrically conductive remote parts, arranged at both sides of the first electrode, wherein the two sets of second electrodes are in physical contact with each other via the electrically conductive remote parts.

In another general aspect, an apparatus, includes (a) a channel surrounding a channel interior, (b) a pressurizer, (c) a transport unit, (d) a first electrode, surrounding at least part of the channel interior over a first electrode length, (e) an electrode configuration comprising (i) a second electrode surrounding at least part of the channel interior over a remote part surrounding length, and (f) a radio frequency wave generator configured to generate RF-waves between the first and second electrode.

The terms "upstream" and "downstream" relate to an arrangement of items or features relative to the propagation of the liquid in the channel, wherein relative to a first position within the channel, a second position in the channel closer to the an inlet of the packaged food product is "upstream", and a third position within the beam of light further away from an inlet of the packaged food product (but closer to an outlet for the heat treated packaged food product) is "downstream".

The term "substantially" herein, such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus comprising one or more of the characterising features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale.

DESCRIPTION OF PREFERRED EMBODIMENTS

Figure 1A:
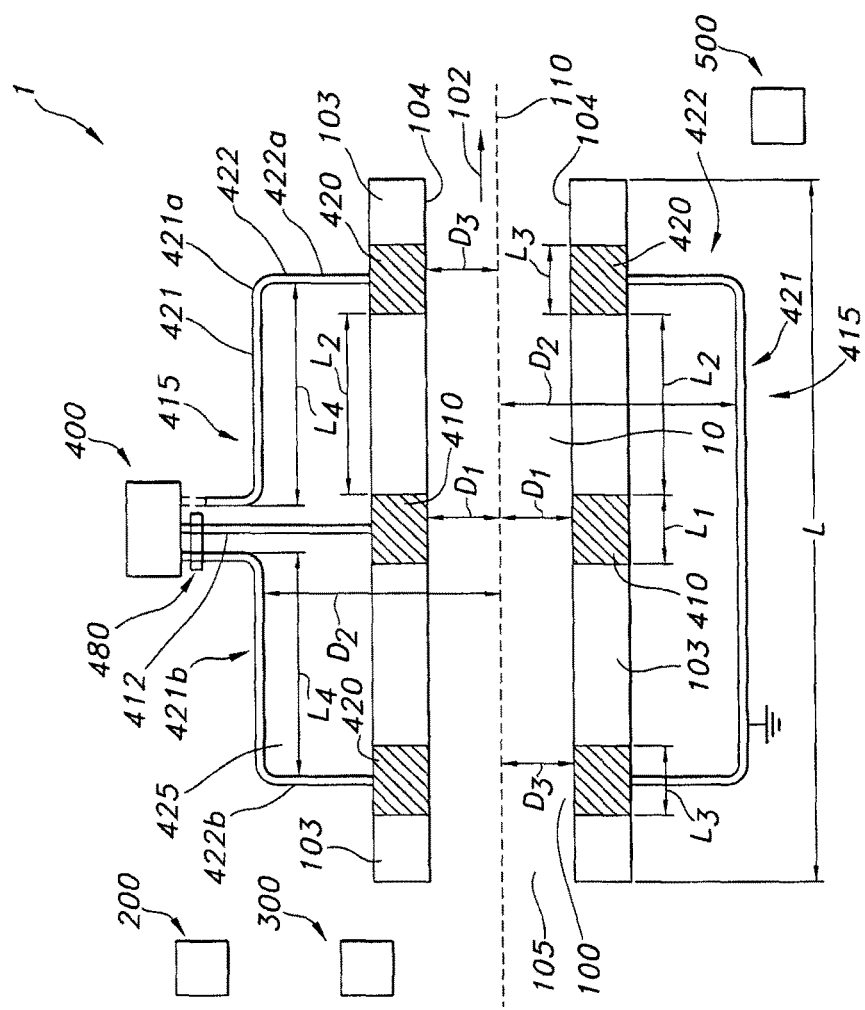
FIG. 1a schematically depicts an embodiment of the apparatus.

FIG. 1a schematically depicts an embodiment of the apparatus, indicated with reference 1 for heat treating a packaged food product (not depicted, however see amongst others FIGS. 1b-1c) in e.g. a continuous packaged food heat treating process. The apparatus 1 comprises a channel 100 with a channel length L, a channel axis 110 and a channel wall 103 (of insulating material, except where the electrodes are; see also below). The channel wall 103 surrounds a channel interior 105. Here, the channel interior is empty, but during processing, the channel interior 105 will be in general be filled with (pressurized) liquid (such as de-ionized a water). The apparatus also comprises a pressurizer (schematically depicted) configured to control the pressure of the liquid (not depicted, however see amongst others FIGS. 1b-1c) within the channel 100. Further, the apparatus comprises a transport unit 300 configured to transport the packaged food product in a propagation direction 102 through the channel 100 (or through the channel interior 105).

The apparatus 1 further comprises a first electrode 410, surrounding at least part of the channel interior 105 over a first electrode length L1, configured at a channel axis-to-first electrode length D1, which is in this embodiment in fact also the distance between the channel axis 110 and the channel wall (i.e. its surface, indicated as channel wall surface 104).

Further, the apparatus 1 comprises an electrode configuration 415 comprising (i) a second electrode 420, arranged at a non-zero inter electrode distance L2 from the first electrode 410. The second electrode 420 also surrounds at least part of the channel interior 105, here over a second electrode length L3. The second electrode is configured at a channel axis-to-second electrode length D3 (which has in general the same value(s) as for the first electrode 410 (i.e. D1)), and which is in this embodiment in fact also the distance between the channel axis 110 and the channel wall (i.e. its surface, indicated as channel wall surface 104). The electrical connection between the RF generator 400 and the first electrode, indicate with reference 412, can (also) be considered a non-parallel part.

The electrode configuration 415 further comprises (ii) an electrically conductive remote part 421 (remote part), in electrically conductive contact with the second electrode 420. The remote part allows the electrode configuration to be used as shielding electrode or outer electrode. For instance, the second 420 electrode and remote part 421 may be of stainless steel. The remote part is configured at a channel axis-to-remote part length D2 wherein D2>D3. Further, the remote part 421 may at least partially surround the channel 100 over a remote part surrounding length L4 for shielding at least part of the channel 100. In general, this length L4 may be substantially be the same as L2. Further, this length L4 can also be considered as describing the heat treatment zone 10, although this zone 10 may extend at least partly beyond the shielded part defined by L4.

Figure 1B:
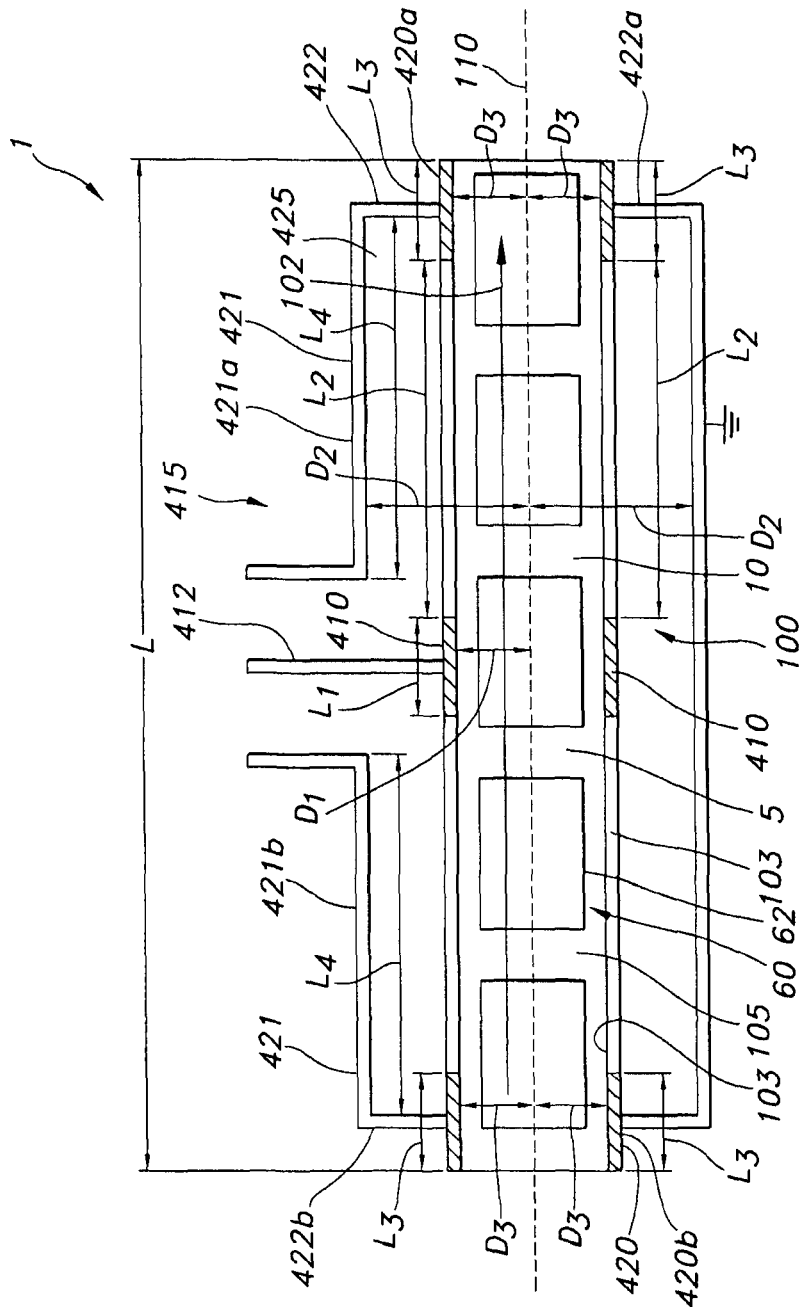
FIGS. 1b-1c schematically depict other embodiments of the apparatus, including for the sake of understanding of the process some packaged food products within the channel.
Figure 1C:
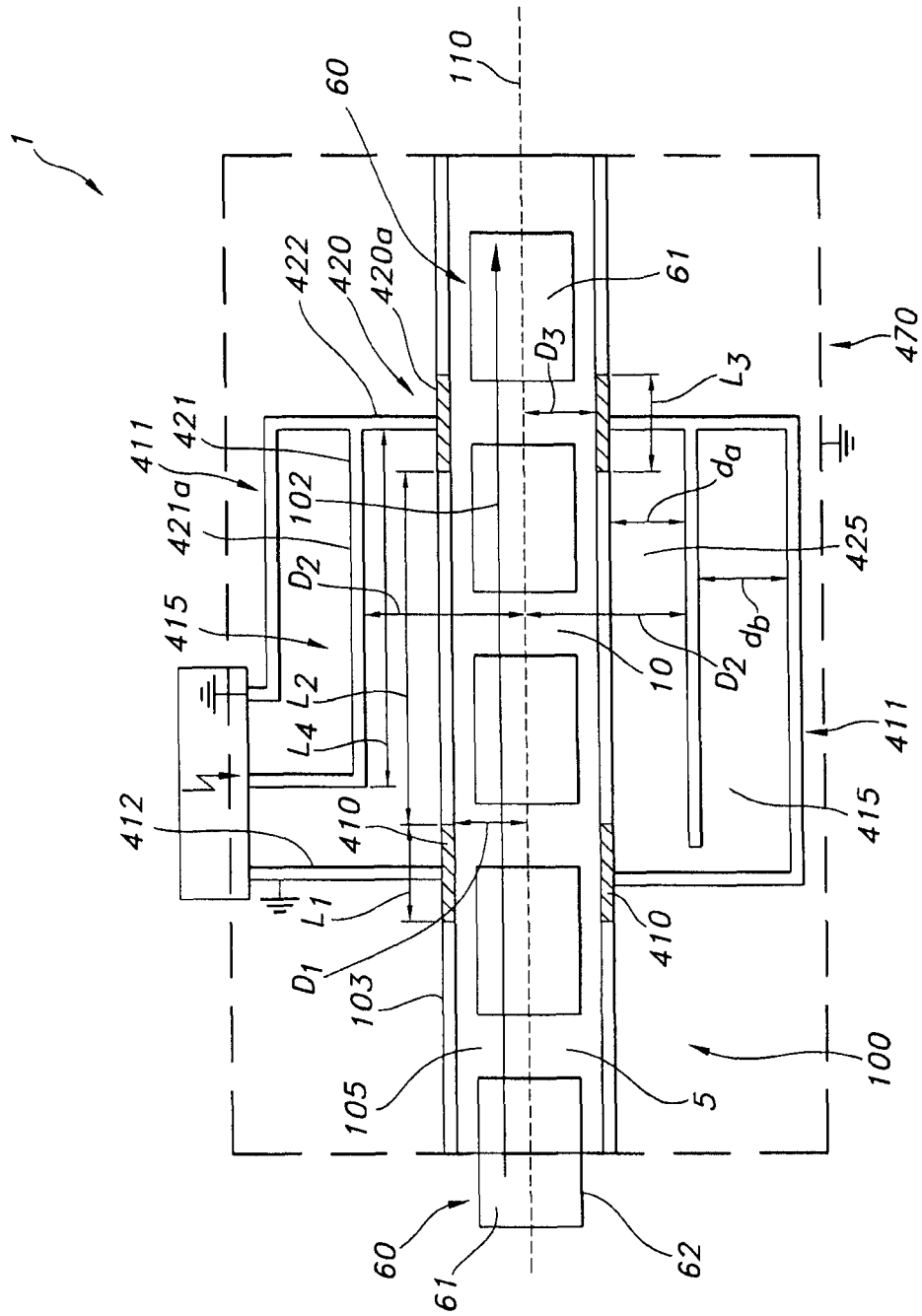

Note that the electrode configuration in FIG. 1a-1c comprises the second electrode 420, a non-parallel part 422, and a parallel part 421. The parallel part, i.e. the part arranged substantially to the channel axis/channel wall. Especially the latter part may in fact define the length L4, as this element is substantial in shielding the RF field. Further, note that the electrode configuration, especially the non-parallel part 422 and a parallel part 421, coaxially surrounds the channel, and thereby form a kind of cavity, indicated with reference 425.

In FIG. 1a, the electrode configuration 415 comprises two sets of second electrodes (420a,420b; see also FIG. 1b) and electrically conductive remote parts 421a,421b, arranged at both sides of the first electrode 410, wherein the two sets of second electrodes 420a,420b are in physical contact with each other via the electrically conductive remote parts 421a,421b. Likewise, the respective non-parallel parts are indicated with reference 422a and 422b. The entire electrode configuration 415 and/or the first electrode may for instance be of stainless steel.

The apparatus further comprises a radio frequency (RF) wave generator 400 configured to generate RF-waves between the first electrode 410 and the second electrode 420. Optionally, the RF wave generator 400 may further include a adjustable impedance matching circuit 480, to modulate the RF field between the first and second electrode(s).

As schematically depicted in FIG. 1a (and also 1b-1c (and 2a)), the first electrode 410 and the second electrode 420 are (in these embodiments) embedded in the channel wall 103 and are in physical contact with the interior 105 of the channel 100. The channel wall 103 further comprises an electrically insulating material (except for the electrodes 410,420). Further, the second electrode 420 may be earthed.

The apparatus also comprises a pressurizer 200 configured to control the pressure of a liquid 5 within the channel 100. This is very schematically indicated. In an embodiment, this may be a pump, in yet another embodiment, it comprises one or more (connected) columns, configured to build up pressure with the liquid.

Also very schematically indicated is a transport unit 300, which is configured to transport the packaged food product 60 in a propagation direction 102 through the channel 100. Part of the transport unit may be configured within the channel 100 (not indicated), such as for instance a chain, a transportable platform, a transportable tray, a transportable rack, rotatable wheels, a conveyor belt, etc. etc. (see also FIGS. 3a and 3b).

Reference 500 may refer to a control unit, configured to control the process and/or one or more elements of the apparatus 1, such as e.g. the pressurizer.

For the sake of understanding, FIG. 1b and onward to not always depict all elements of the apparatus, such as the (optional) pressurizer 200 or the (optional) transport unit 300, etc.

FIGS. 1b and 1c schematically depict alternative embodiments, with FIG. 1b schematically depicting substantially the same embodiment as depicted in FIG. 1a, and with FIG. 1c schematically depicting an (asymmetrical) embodiment wherein the electrode configuration comprises a single second electrode 420 and remote part 420, arranged at one side of the first electrode 410. Note that especially in the latter case, shielding with a Faraday cage, indicated with reference 470 may be desired.

In FIG. 1c, in fact the first electrode 410 can be considered to be of another electrode configuration, comprising the first electrode 410 and an electrical conductive remote part 411, in electrical conductive contact with the first electrode 410, configured at a distance db from the (first) electrically conductive remote part 421, and preferably arranged parallel with the (first) electrically conductive remote part 421. The electrical conductive remote part 411 is in electrical connection with the first electrode via the non-parallel part 412 of the first electrode. This non-parallel part 412 of the first electrode is in electrical contact with the radio frequency generator, and is earthed (grounded). At the opposite end of the electrical conductive remote part 411, it is in electrical contact with the non-parallel part 422 of the second electrode. The RF-generator 400 may be configured to have a current in the order of 10 A-1000 A through the (first) electrically conductive remote part 421 (and (second) electrically conductive remote part 411). The distance of the channel wall to the (first) electrically conductive remote part 421 is indicated with reference da; the distance of the (second) electrically conductive remote part 411 to the (first) electrically conductive remote part 421 is indicated with reference db. Especially db>da, even more especially db/da≥3. Hence, this embodiment comprises two coaxially arranged surrounding electrically conductive parts.

Figure 2A:
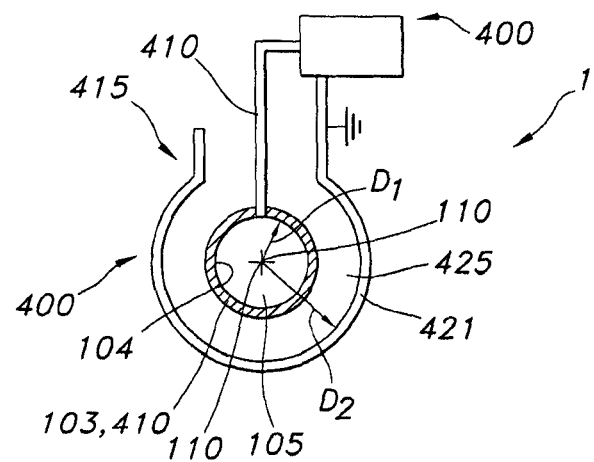
FIGS. 2a-2c schematically depict some further aspects of the invention.

FIG. 2a schematically depicts a cross-sectional view of an embodiment of part of the apparatus 1. Here, a channel 100 with a round or circular cross-section is depicted. However, channels 100 with other cross sections may also be possible. The cross-sectional shape of the channel 100 may even vary along the channel axis 110. First electrode 410 here completely surrounds the channel interior 105.

Figure 2B:
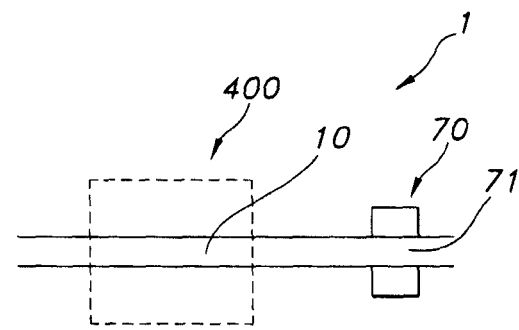

FIG. 2b very schematically depicts an embodiment of the apparatus, wherein downstream of the heat treatment unit 400, an optional cooling unit 70 is arranged. The cooling unit provides a cooling zone, wherein the heat treated packaged food product may optionally be cooled. The cooling unit 70 may include a heat exchanger. Part of the energy extracted from the system may be reintroduced into the heat treatment zone, if desired.

Figure 2C:
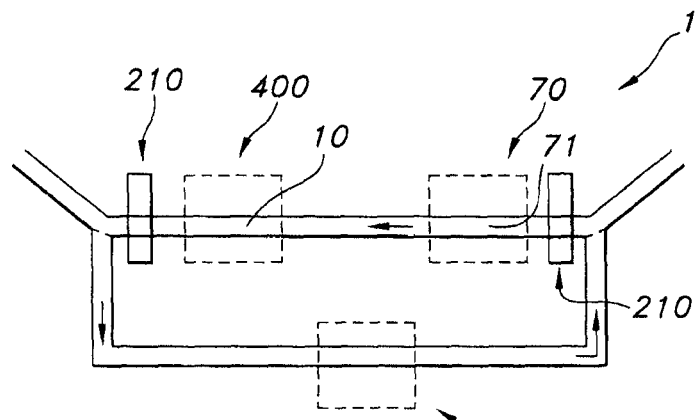

FIG. 2c very schematically depicts another system wherein the liquid can flow in a return system and wherein unit 80 may be used to (further) cool the liquid. For instance, this may be done with a heat exchanger. Part of the energy extracted from the system may be reintroduced into the heat treatment zone, if desired.

As can be derived from the above drawings, when the liquid flows through the channel, the liquid will be in contact with the first and second electrode(s).

Figure 3A:
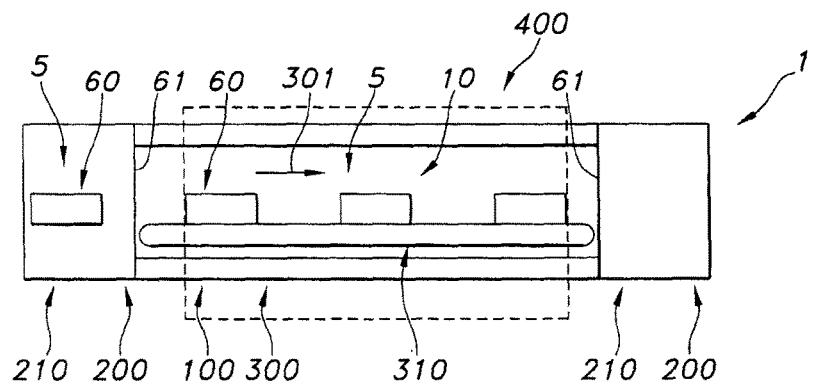
FIGS. 3a-3c schematically also depict some further aspects of the invention.

FIG. 3a very schematically depicts an embodiment of the apparatus 1, wherein the transport unit 300 comprises a transporter 310, which may for instance be a (rotating) chain, a conveyor belt, etc. Reference 310 indicates the transport direction. Further, this schematic drawing depicts the use of pressure locks 210, one upstream and one downstream of the treatment zone 10. For the sake of understanding, other items of the apparatus are not displayed.

Figure 3B:
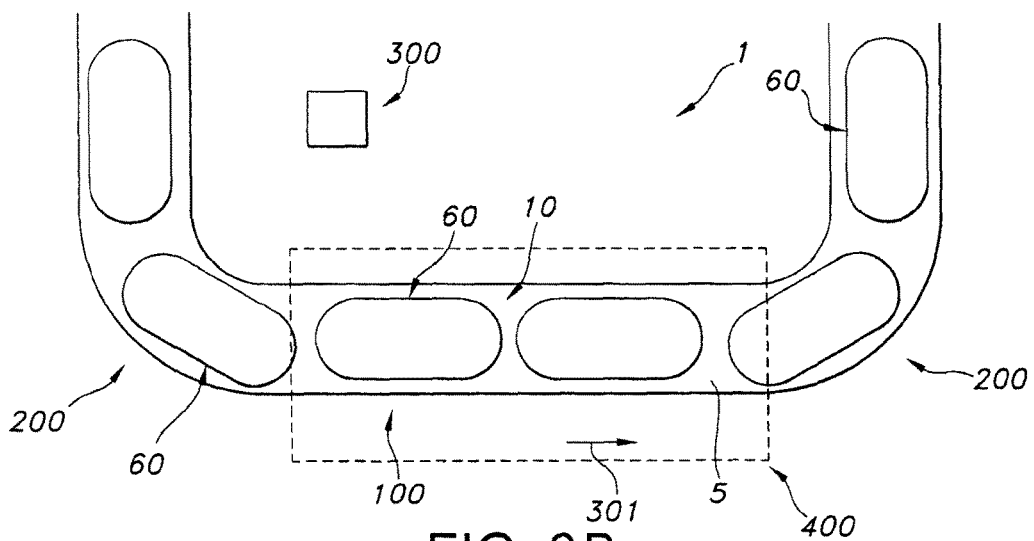

FIG. 3b schematically depicts an embodiment wherein part of the channel 100 is curved, and has a column that may be used to build up pressure by the liquid column. Hence, this simple shape may already be used as pressurizer 200. However, other pressurizes may also be applied. Pressure locks, not depicted, may maintain the desired pressure over (at least) the heat treatment zone.

Figure 3C:
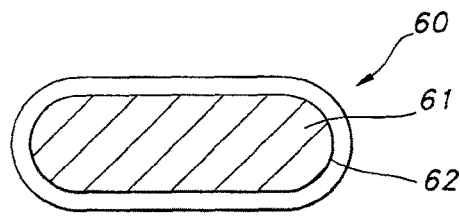

FIG. 3c schematically depicts an embodiment of the packaged food product 60, comprising a food product 61 contained by packaged 62. The package is fluid impermeable, i.e. the food product 61 is hermetically sealed from the liquid when being processed in the apparatus.

The invention claimed is:

1. A method for heat treating a packaged product, the method comprising:

providing a channel with a liquid disposed therein, the channel having a plurality of electrodes disposed in and spaced apart along a treatment portion of the channel, wherein the plurality of electrodes comprises a first electrode and a second electrode, wherein the first electrode and the second electrode are arranged at a mutual axial interspace with the second electrode being adjacent to the first electrode and arranged at a non-zero distance from the first electrode, and with each of the first and second electrode surrounding at least a part of the channel and coupled to a radio-frequency (RF) source;

pressurizing the liquid in the treatment portion of the channel;

transporting the packaged product, including a product disposed within a package, along the channel including transporting the packaged product through the treatment portion of the channel, wherein the package is electrically insulating;

heating the packaged product in the treatment portion of the channel including causing emission of radio frequency waves between the first electrode surrounding the at least part of the channel, and the second electrode, adjacent to the first electrode and spaced apart from the first electrode along the treatment portion of the channel and surrounding the at least part of the channel, and into the treatment portion of the channel to form an electrical field emitted between the adjacent first and second electrodes in the treatment portion of the channel; and shielding the electrical field in the treatment portion of the channel using a shield which forms a cavity around the treatment portion of the channel, the cavity being configured to substantially confine the electrical field.

2. The method of claim 1 wherein the packaged product is surrounded by the pressurized liquid in the treatment portion of the channel.

3. The method of claim 2 wherein the pressurized liquid is substantially stationary in the channel and transporting the packaged product along the channel includes transporting the packaged product through the pressurized liquid.

4. The method of claim 3 wherein transporting the packaged product along the channel includes conveying the packaged product using one of a chain, a transportable platform, a transportable tray, a transportable rack, rotatable wheels or a conveyor belt.

5. The method of claim 2 wherein transporting the packaged product through the treatment portion of the channel includes causing the pressurized liquid to move through the treatment portion of the channel such that the packaged product moves with the pressurized liquid.

6. The method of claim 1 wherein pressurizing the liquid in the treatment portion of the channel includes maintaining a pressure of the liquid at a desired pressure value.

7. The method of claim 6, wherein the pressure is selected from the range of 1.5-6 bar.

8. The method of claim 1 wherein the shield is formed from electrically conductive portions of one or more electrodes of the plurality of electrodes.

9. The method of claim 1 wherein a frequency of the radio frequency waves emitted between the plurality of electrodes is in a range of 10 MHz-50 MHz.

10. The method of claim 1 wherein the packaged product is fluid impermeable.

11. The method of claim 1 wherein heating the packaged product includes heating the packaged product to temperature in a range of 50° C.-150° C.

12. The method of claim 1 wherein the channel includes a first pressure lock at an upstream end of the treatment portion and a second pressure lock at a downstream end of the treatment portion, and pressurizing the liquid includes closing the pressure locks and pressurizing the liquid between the first pressure lock and the second pressure lock.

13. The method of claim 1 wherein the packaged product has a length in the range of 5 cm-100 cm and a width in the range of 1 cm-50 cm.

14. The method of claim 1 wherein each electrode of the plurality of electrodes at least partially surrounds the channel.

15. The method of claim 1 wherein the liquid comprises one or more of de-ionized water and oil.

16. The method of claim 1 wherein at least some electrodes of the plurality of electrodes are in physical contact with the liquid.

17. The method according to claim 1, wherein the plurality of electrodes comprises a third electrode arranged at a side of the first electrode, wherein the third electrode is arranged at a mutual axial interspace relative to the first electrode.

18. The method of claim 1, wherein providing the channel comprises:
provide the channel comprising the first electrode and the second electrode, with each of the first electrode and the second electrode entirely surrounding the channel at respective spaced apart locations along the treatment portion of the channel.

19. A process for heat treating a packaged product comprising a product within a package with an apparatus, the process comprising transporting the packaged product through a channel filled with the pressurized liquid and heating the product in a treatment zone of the channel by generating RF-waves at a frequency selected from the range of 10-50 MHz between a first electrode and a second electrode, wherein the apparatus comprises the first electrode and the second electrode for creating the RF field for heat treating the product, wherein the first and the second electrode are arranged at a mutual axial interspace with the second electrode being adjacent to the first electrode and arranged at a non-zero distance from the first electrode, and with each of the first and second electrode surrounding at least a part of the channel and coupled to a radio-frequency (RF) source, wherein the packaged food product comprises a food product contained by a package, wherein the package is fluid impermeable, wherein the package is electrically insulating, wherein the first electrode surrounds at least part of the channel interior over a first electrode length, and wherein the RF field is emitted between the adjacent first and second electrodes in the treatment zone of the channel.

20. A process for heat treating a packaged product comprising a product within a package with an apparatus for heat treating the packaged product in a heat treating process, the apparatus comprising:
a. a channel with a channel length (L), a channel axis and a channel wall, wherein the channel wall surrounds a channel interior;
b. a pressurizer configured to control the pressure of a liquid within the channel;
c. a transport unit configured to transport the packaged product in a propagation direction through the channel;
d. a first electrode, surrounding at least part of the channel interior over a first electrode length (L1), configured at a channel axis-to-first electrode length (D1);
e. an electrode configuration comprising two sets of second electrodes and electrical conductive remote parts, arranged at both sides of the first electrode, wherein the two sets of second electrodes and the electrical conductive remote parts are in physical contact with each other via the electrically conductive remote parts, wherein the first and the second electrodes are arranged at a substantial mutual axial interspace between the first and the second electrodes respectively with each of the second electrodes being adjacent to the first electrode and arranged at a respective non-zero distance from the first electrode, and with each of the first and the second electrodes surrounding at least a part of the channel and coupled to a radio-frequency (RF) wave generator, wherein the second electrodes surrounding at least part of the channel interior over a second electrode length (L3) and configured at a channel axis-to-second electrode length (D3), and wherein the electrically conductive remote parts are configured at a channel axis-to-remote part length (D2) wherein D2>D3, and coaxially surrounding at least part of the channel interior over a remote part surrounding length (L4) for shielding at least part of the channel;
f. the radio frequency (RF) wave generator configured to generate RF-waves between the first electrode and the second electrodes,
wherein the first electrode and the second electrodes are embedded in the channel wall and are in physical contact with the interior of the channel, and wherein the channel wall further comprises an electrically insulating material; the process comprising transporting the packaged product through the channel filled with the pressurized liquid and heating the product in a treatment zone of the channel by generating RF-waves at a frequency selected from the range of 10-50 MHz emitted between the first electrode and the second electrodes, wherein the packaged product comprises a packaged food product, and wherein during processing the packaged food product is substantially surrounded by the liquid, and wherein the RF-waves form an electrical field and the process further comprises shielding the electrical field in the treatment zone using the electrically conductive remote parts, wherein the electrically conductive remote parts form a cavity around the treatment zone, the cavity being configured to substantially confine the electrical field.

21. The process of claim 20 wherein the channel includes a first pressure lock at an upstream end of the treatment zone and a second pressure lock at a downstream end of the treatment zone, and pressurizing the liquid includes closing the pressure locks and pressurizing the liquid between the first pressure lock and the second pressure lock.

\* \* \* \* \*